(12) United States Patent
Inukai (10) Patent No.: US 7,336,507 B2
(45) Date of Patent: Feb. 26, 2008

(54) POWER SUPPLY OUTPUTTING MULTIPLE VOLTAGES

(75) Inventor: Katsumi Inukai, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 365 days.

(21) Appl. No.: 11/091,375

(22) Filed: Mar. 29, 2005

(65) Prior Publication Data

US 2005/0219868 A1 Oct. 6, 2005

(30) Foreign Application Priority Data

Mar. 31, 2004 (JP) .............................. 2004-105763

(51) Int. Cl.
*H02M 3/335* (2006.01)
*H02J 1/00* (2006.01)
*G05F 1/12* (2006.01)

(52) U.S. Cl. ............................... 363/21.15; 363/21.12; 307/35

(58) Field of Classification Search ................... 363/37, 363/74, 76, 73, 97, 21.03, 21.04, 21.12, 21.15, 363/21.16, 16, 20, 21.01, 21.07, 21.08, 21.09, 363/131; 323/50, 221, 247, 305, 902; 307/38, 307/39, 35

See application file for complete search history.

(56) References Cited

U.S. PATENT DOCUMENTS

| | | | | |
|---|---|---|---|---|
| 5,991,168 | A | * | 11/1999 | Farrington et al. ............. 363/16 |
| 6,433,443 | B2 | * | 8/2002 | Nishida et al. ................. 307/35 |
| 6,690,586 | B2 | * | 2/2004 | Hosotani et al. ............... 363/19 |
| 6,922,345 | B2 | * | 7/2005 | Nishida et al. .......... 363/21.16 |
| 6,980,443 | B2 | * | 12/2005 | Nagano et al. .......... 363/21.12 |
| 2006/0018136 | A1 | * | 1/2006 | Takahashi ................. 363/21.15 |

FOREIGN PATENT DOCUMENTS

| | | |
|---|---|---|
| JP | A-57-129131 | 8/1982 |
| JP | A-4-251563 | 9/1992 |
| JP | A-6-113535 | 4/1994 |
| JP | A-9-163748 | 6/1997 |
| JP | A-10-271819 | 10/1998 |
| JP | A-2000-014141 | 1/2000 |
| JP | A-2002-300418 | 10/2002 |

OTHER PUBLICATIONS

Hambley, A.R. Electronics. New Jersey, Prentice Hall, 2000, second edition, pp. 133,134,152 and 268-274.*

* cited by examiner

*Primary Examiner*—Matthew V. Nguyen
(74) *Attorney, Agent, or Firm*—Oliff & Berridge, PLC.

(57) ABSTRACT

A power supply includes a transformer, a second output line, a second output line, a controller, and a current bypass circuit. The transformer has a primary side and a secondary side. The first output line derived from a first point on the secondary side. The first output line outputs a first voltage. The second output line is derived from a second point on the secondary side. The second output line outputs a second voltage lower than the first voltage. The controller controls an amount of current flowing in the primary side based on the second voltage so that the second voltage is maintained at a prescribed voltage. The current bypass circuit controls current flowing in the first output line to flow in the first output line when a potential difference between the second voltage and the second voltage exceeds a prescribed value.

19 Claims, 4 Drawing Sheets

POWER SUPPLY OUTPUTTING MULTIPLE VOLTAGES

BACKGROUND

The present invention relates to a power supply, particularly, to a power supply capable of outputting multiple voltages.

An electrical equipment such as laser printer is normally provided with a power supply that converts AC voltage supplied from an external commercial power supply to DC voltage. Also, the laser printer is provided with a motor and logic circuit, where each of them is driven respectively by a different voltage. Accordingly, the power supply often can supply multiple voltages.

An example of a conventional power supply that outputs multiple voltages as described above is disclosed in Japanese Patent Application Publication No. 2000-14141. This power supply performs a feedback control wherein an amount of current flowing in a primary side of a transformer is controlled based on a voltage of a secondary side of the transformer.

However, the cost of the device increases if the feedback control is performed for each of the multiple voltages. Japanese Patent Application Publication No. 2000-14141 performs the feedback control only for high voltage and generates lower voltage from the high voltage using a DC-DC converter.

However, Japanese Patent Application Publication No. 2000-14141 also causes increase of cost since the device has multiple DC-DC converters.

SUMMARY

In view of the above-described drawbacks, it is an objective of the present invention to provide a power supply that can output multiple voltages and realize a reduction in cost.

In order to attain the above and other objects, the present invention provides a power supply including a transformer, a first output line, a second output line, a controller, and a current bypass circuit. The transformer has a primary side and a secondary side. The first output line derived from a first point on the secondary side. The first output line outputs a first voltage. The second output line is derived from a second point on the secondary side. The second output line outputs a second voltage lower than the first voltage. The controller controls an amount of current flowing in the primary side based on the second voltage so that the second voltage is maintained at a prescribed voltage. The current bypass circuit controls current flowing in the first output line to flow in the second output line when a potential difference between the first voltage and the second voltage exceeds a prescribed value.

The first voltage of the first output line can be placed into the proper range, since current flowing in the first output line is bypassed to the second output line. Therefore, overvoltage is not applied to a load connected to the first output line.

It is preferable that the current bypass circuit includes a switching element connected between the first output line and the second output line. The switching element is closed when the potential difference exceeds the prescribed value while the switching element is open when the potential difference is equal to or below the prescribed value.

It is preferable that the current bypass circuit includes a zener diode having an anode terminal connected to the second output line and a cathode terminal connected to the first output line. The zener diode allows current to flow from the first output line to the second output line when the potential difference exceeds the prescribed value, while the zener diode prevents current from flowing from the first output line to the second output line when the potential difference is equal to or below the prescribed value.

It is preferable that the current bypass circuit includes a shunt regulator having an anode terminal connected to the second output line, a cathode terminal connected to the first output line, and a detecting terminal connected to detect the potential difference. The shunt regulator allows current to flow from the first output line to the second output line when the potential difference exceeds the prescribed value, while the shunt regulator prevents current from flowing from the first output line to the second output line when the potential difference is equal to or below the prescribed value.

It is preferable that the current bypass circuit includes a transistor. The transistor allows current to flow therein when the potential difference exceeds the prescribed value, while the transistor prevents current from flowing therein when the potential difference is equal to or below the prescribed value.

It is preferable that the current bypass circuit includes a shunt regulator having an anode terminal connected to the second output line, a cathode terminal and a detecting terminal to detect the potential difference, and a transistor having a first terminal connected to the cathode terminal, a second terminal connected to the second output line and a third terminal connected to the first terminal. The shunt regulator controls the transistor to close when the potential difference exceeds the prescribed value, while the shunt regulator controls the transistor to open when the potential difference is equal to or below the prescribed value.

It is preferable that the power supply further includes a delaying unit that transmits the potential difference to the current bypass circuit after a prescribed time has elapsed.

It is preferable that the delaying unit includes a resistor and a capacitor connected in series.

It is preferable that the power supply further includes a storage unit connected between the current bypass circuit and the second output line. The storage unit stores electric charges when current is flowing from the first output line to the second output line, while the storage unit supplies the electric charges stored therein for the second output line when current is prevented from flowing from the first line to the second output line.

It is preferable that the storage unit includes an inductor having a first terminal connected to the current bypass circuit and a second terminal connected to the second output line.

It is preferable that the power supply further includes a rectifier element having an anode terminal connected to ground and a cathode terminal connected to the first terminal of the inductor.

In another aspect of the present invention, a power supply includes a transformer, a first output line, a second output line, a controller, and a current bypass circuit.

The transformer has a primary side and a secondary side. The first output line is derived from a first point on the secondary side. The first output line outputs a first voltage. The second output line is derived from a second point on the secondary side. The second output line outputs a second voltage lower than the first voltage. The controller controls an amount of current flowing in the primary side based on the second voltage so that the second voltage is maintained at a prescribed voltage. The current bypass circuit controls current flowing in the first output line to flow in the second output line when the first voltage exceeds a prescribed value.

It is preferable that the current bypass circuit includes a switching element connected between the first output line and the second output line. The switching element is closed when the first voltage exceeds the prescribed value, while the switching element is open when the first voltage is equal to or below the prescribed value.

It is preferable that the current bypass circuit includes a shunt regulator having an anode terminal connected to the second output line, a cathode terminal connected to the first output line, and a detecting terminal connected to detect the first voltage. The shunt regulator allows current to flow from the first output line to the second output line when the first voltage exceeds the prescribed value, while the shunt regulator prevents current from flowing from the first output line to the second output line when the first voltage is equal to or below the prescribed value.

It is preferable that the current bypass circuit includes a transistor. The transistor allows current to flow therein when the first voltage exceeds the prescribed value, while the transistor prevents current from flowing therein when the first voltage is equal to or below the prescribed value.

It is preferable that the current bypass circuit includes a shunt regulator having an anode terminal connected to the second output line, a cathode terminal and a detecting terminal to detect the first voltage, and a transistor having a first terminal connected to the cathode terminal, a second terminal connected to the second output line and a third terminal connected to the first terminal. The shunt regulator controls the transistor to close when the first voltage exceeds the prescribed value, while the shunt regulator controls the transistor to open when the first voltage is equal to or below the prescribed value.

It is preferable that the power supply further includes a delaying unit that transmits the first voltage to the current bypass circuit after a prescribed time has elapsed.

It is preferable that the delaying unit includes a resistor and a capacitor connected in series.

It is preferable that the power supply further includes a storage unit connected between the current bypass circuit and the second output line, wherein the storage unit stores electric charges when current is flowing from the first output line to the second output line, while the storage unit supplies the electric charges stored therein for the second output line when current is prevented from flowing from the first line to the second output line.

It is preferable that the storage unit includes an inductor having a first terminal connected to the current bypass circuit and a second terminal connected to the second output line.

It is preferable that the power supply further includes a rectifier element having an anode terminal connected to ground and a cathode terminal connected to the first terminal of the inductor.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF PREFERRED EMBODIMENTS

A power supply according to a preferred embodiment of the present invention will be described while referring to the accompanying drawings wherein like parts and components are designated by the same reference numerals to avoid duplicating description.

Figure 1:
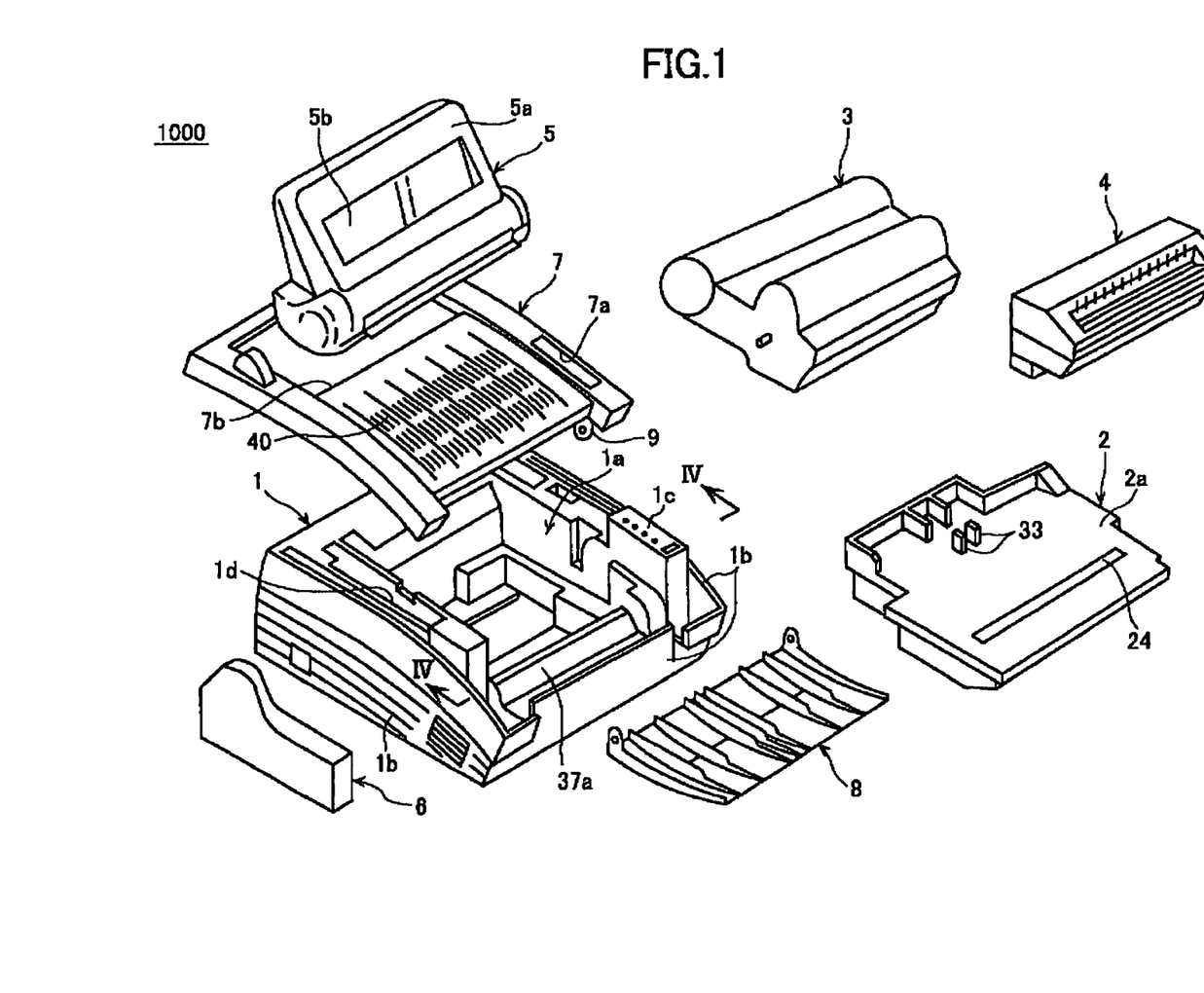
FIG. 1 is a perspective view of major structural parts of a laser printer.
Figure 2:
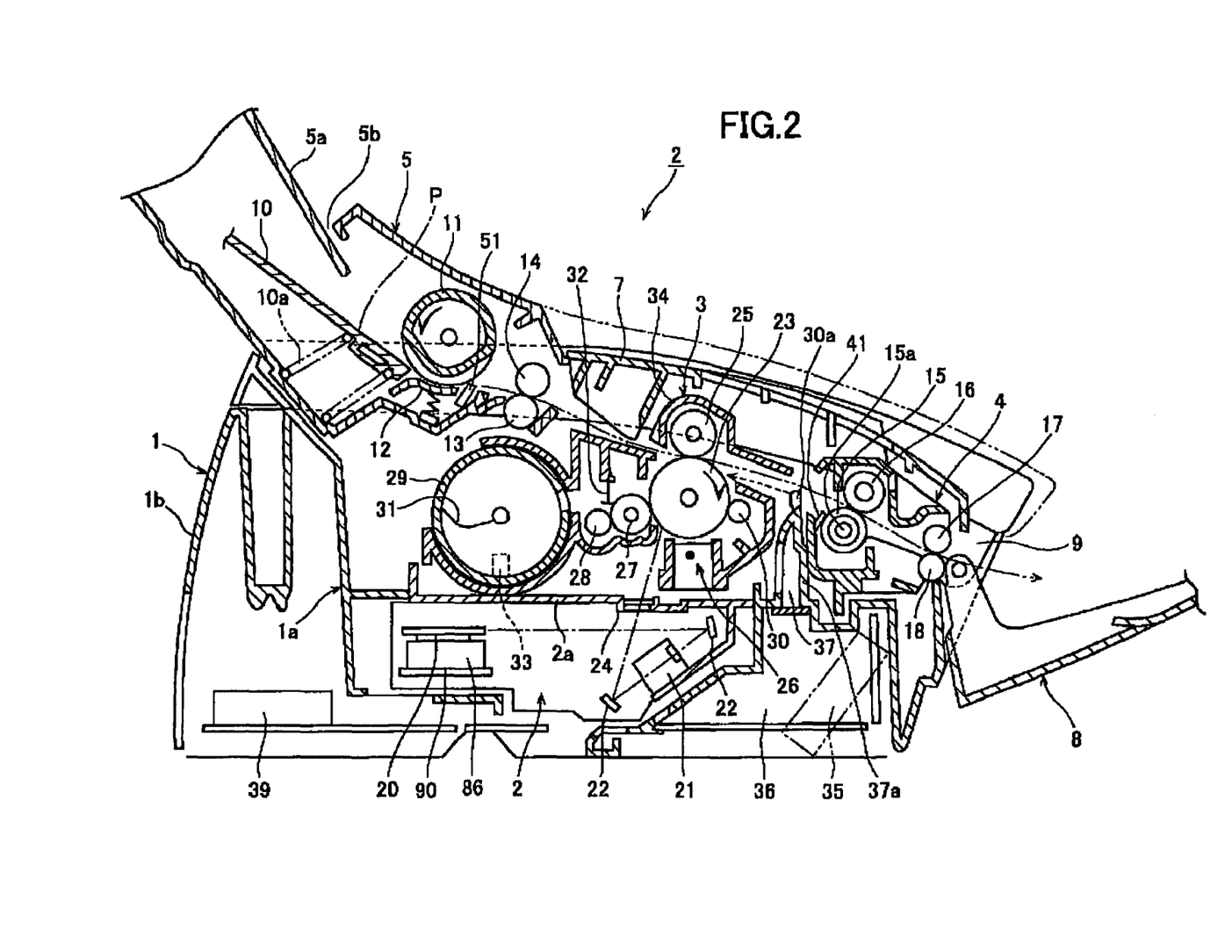
FIG. 2 is a cross-sectional view of the laser printer.

In this embodiment, a power supply 2000 (FIG. 4) is mounted on a laser printer 1000. FIG. 1 is a perspective view of main components of the laser printer 1000. FIG. 2 is a cross-sectional view of the laser printer 1000.

The laser printer 1000 is provided with a main casing 1, a scanner unit 2, a process unit 3, a fixing unit 4, a paper supply unit 5, a drive unit 6, a top cover 7 and a paper delivery tray 8. Further, the laser printer 1000 is provided with a logic circuit (not shown) that controls the aforementioned units, and a power supply 2000 that supplies electric power to the logic circuit and to the aforementioned units.

The main casing 1, which is made of plastic, has the main frame 1*a*, a main cover 1*b*, an operating panel 1*c* and an accommodation recess 1*d*. The main covers 1*b* covers the outer surfaces on all four sides (the front, rear, and left and right sides) of the main frame 1*a*. The main frame 1*a* and the main cover 1*b* are formed integrally by an ejection molding, for example. The operating panel 1*c* protrudes upward from the right side of the main frame 1*a*. The accommodation recess 1*d* is formed in the left side of the main frame 1*a* and the main cover 1*b* formed integrally.

The drive unit 6 includes a main motor and a gear train (not shown). The drive unit 6 is inserted from the lower side of the main casing 1 into an accommodation recess 1*d* and attached thereto.

The top cover 7, which is made of plastic, covers the upper surfaces of the main frame 1*a* and the main cover 1*b*. In the top cover 7, a through-hole 7*a* and a through-hole 7*b* are formed. The through-hole 7*a* passed through the operating panel 1*c*. The through-hole 7*b* passes through the paper supply unit 5. Further, the top cover 7 is provided with brackets 9 that protrude respectively from the left and right sides of the front edge of the top cover 7 (although only one bracket 9 is shown in FIG. 1).

The paper delivery tray 8 is attached to the brackets 9, where the brackets 9 are able to move up and down. When the paper tray 8 is not in use, the paper delivery tray 8 can be folded up toward the upper surface of the top cover 7.

The paper supply unit 5 is provided with a feeder case 5*a* and a manual insertion opening 5*b*. Within the feeder case 5*a*, recording paper P is set in a stacked state. As shown in FIG. 2, the leading edge of the recording paper P is pressed toward a paper supply roller 11 by a support plate 10, wherein the support plate 10 is pressed toward upper by screws 10*a* within the feeder case 5*a*. Therefore, sheets of the recording paper P can be separated one at a time by a combination of a separation pad 12 and the paper supply roller 11, where the paper supply roller 11 is rotating due to the power transmitted from the drive unit 6, and can be sent on to a pair of upper and lower registration rollers 13 and 14.

The manual insertion opening 5*b* opens diagonally upward of the paper supply unit 5. A recording medium that is different from the recording paper P within the feeder case 5*a* can be inserted into the manual insertion opening 5*b* for recording.

The process unit 3 forms an image (toner image) by a developer (toner) on the surface of the recording paper P that is sent through the registration rollers 13 and 14.

The fixing unit 4 is provided with a heating roller 15 and a pressure roller 16. The recording paper P on which the toner image is formed is heated while being sandwiched between a heating roller 15 and a pressure roller 16, in order to fix the toner image onto the recording paper P.

The heating roller 15 has a fixing heater 15a that is inserted into an aluminum tube coated with fluorine. A substantially central portion of an outer surface of the heating roller 15 is in contact with a thermistor 41. The pressure roller 16 is a rubber roller having a surface covered with a fluoroplastic.

A paper delivery unit is provided with a paper delivery roller 17 and a pinch roller 18 that are disposed on the downstream side within the casing of the fixing unit 4. The paper delivery unit delivers the recording paper P, where the toner image has been fixed, to the paper delivery tray 8. A recording medium conveying path is configured by a portion from the paper supply roller 11 to the paper delivery portion.

An upper support plate 2a of the scanner unit 2 is fixed to stays by screws or the like at a part that is below the process unit 3 disposed in a substantially central portion of the main frame 1a, where the stays are formed integrally on the upper surface side of the base plate of the main frame 1a.

The scanner unit is provided with a light-emitting portion (not shown), a polygon mirror 20, a lens 21, and a reflective mirror 22, on the lower surface side of a plastic upper support plate 2a. The polygon mirror 20 is rotated at high speed by a scanner motor 86 driven by a motor drive circuit 90. A laser emitted from the light-emitting portion is deflected by the polygon mirror 20 and passes through a glass plate 24, and exposes the outer peripheral surface of the photosensitive drum 23, where the glass plate 24 covers a long, thin scanner hole, which is pierced through the upper support plate 2a so as to extend along the axial line of the photosensitive drum 23.

The process unit 3 is provided with the photosensitive drum 23, a transfer roller 25, a scorotron type of charger 26, a developer device, a removable toner cartridge 29, a cleaning roller 30, and a charge removal lamp 30a.

The transfer roller 25 is in rotatable contact with the upper surface of the photosensitive drum 23. The scorotron type charger 26 is disposed below the photosensitive drum 23. The developer device has a developer roller 27 and a supply roller 28, which are disposed on the upstream side of the photosensitive drum 23 in the paper supply direction. The developer (toner) supplier, in other words, a removable toner cartridge 29 is disposed further upstream of the developer device. The cleaning roller 30 is disposed downstream from the photosensitive drum 23. The charge removal lamp 30a is disposed further downstream from the cleaning roller 30.

A latent electrostatic image is formed on the outer peripheral surface of the photosensitive drum 23 when the laser beam emitted from the scanner unit 2 is scanned over the surface of the photosensitive drum 23 that has been charge uniformly by the charger 26. The developer (toner) within the toner cartridge 29 has been agitated by an agitator 31 and discharged. Then, the developer (toner) is carried on the outer peripheral surface of the developer roller 27 via the supply roller 28, and the thickness of the toner layer thereon is regulated by a blade 32.

The latent electrostatic image formed on the surface of the photosensitive drum 23 is developed into a visible image when developer from the developer roller 27 adheres to the latent image. The image (toner image) formed by this developer is transferred to the recording paper P that passes between the photosensitive drum 23 and the transfer roller 25 to which is applied a transfer bias of a potential opposite to that of the photosensitive drum 23. The toner remaining on the photosensitive drum 23 is collected temporarily by the cleaning roller 30. The toner corrected is returned to the process unit 3 for re-use.

Note that a toner sensor 33 having a paired light-emitting portion and light-receiving portion is mounted on the upper support plate 2a of the scanner unit 2 so as to protrude upward from the upper support plate 2a. The toner sensor 33 faces a recess in the lower surface of the toner cartridge 29 in the process unit 3 so that the toner sensor 33 can detect the presence or absence of toner within the toner cartridge 29.

The process unit 3 is formed as a cartridge that is inserted into a plastic case 34. The thus-packaged process unit 3 can be mounted removably in the main frame 1a. An accommodation portion 36 for accommodating a cooling fan 35 and a ventilation duct 37 extending in the lateral direction crossing the direction of travel of the recording paper P are connected on a lower surface side linking a forward position of the main frame 1a and a forward position of the main cover 1b. An upper surface plate 37a of the ventilation duct 37 is formed to have an inverted V-shape in section. This upper surface plate 37a is positioned between the process unit 3 and the fixing unit 4 to shield the process unit 3 side from direct transmission of heat emitted from the heating roller 15 in the fixing unit 4.

The cooling air flow produced by the cooling fan 35 passes through the ventilation duct 37 and is transferred to the lower surface on one side of the main frame 1a, and cools a power source 39 at the rear and the main motor within the drive train unit 6. Also, the cooling air flow is blown from a plurality of slits that open on the process unit 3 side so that the cooling air flow passes upward between the process unit 3 and the fixing unit 4, and is exhausted out of the device from a plurality of exhaust holes 40 that pierce through the top cover 7.

Figure 3:
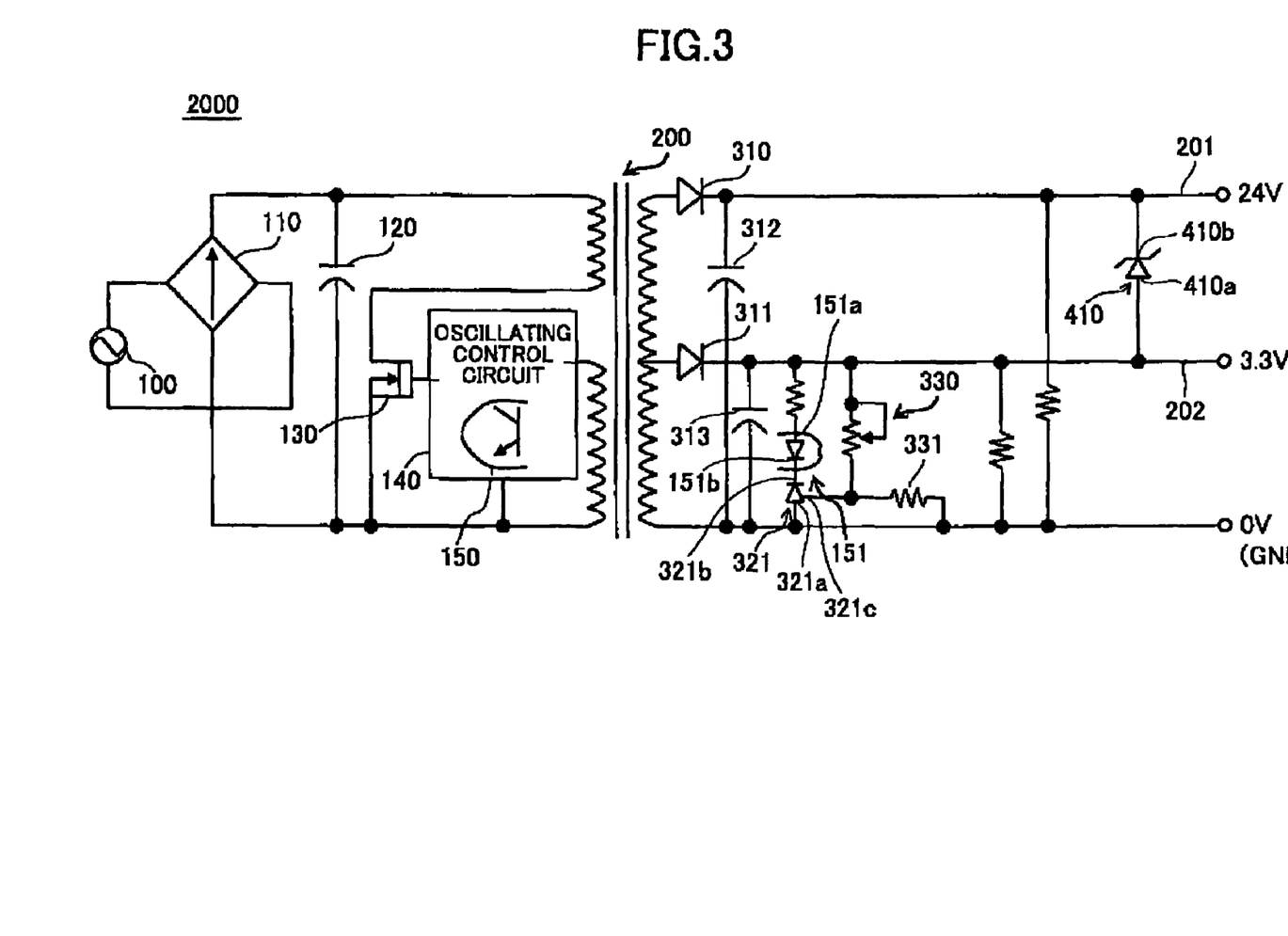
FIG. 3 is a circuit diagram of a power supply of a first embodiment.

Next, the power supply 2000 according to a first embodiment of the invention will be described with reference to FIG. 3. FIG. 3 is a circuit diagram of the power supply 2000.

The power supply 2000 is provided with a transformer 200 including a primary side and secondary side, where each of the primary side and the secondary side has a coil. Further, the power supply 2000 is provided with a rectification circuit 110, a smoothing capacitor 120, a switching element 130 and an oscillating control circuit 140 at the primary side.

The rectification circuit 110 rectifies current supplied from a commercial power supply (e.g. AC100V) 100. The smoothing capacitor 120 smoothes the current rectified by the rectification circuit 110. Thus, AC input from the commercial power supply 100 is converted to DC by the rectification circuit 110 and the smoothing capacitor 120. The DC is input to the coil on the primary side.

The switching element 130 is connected to the coil on the primary side, and performs on/off switchings. The oscillating control circuit 140 controls an amount of current flowing in the primary side.

Specifically, the oscillating control circuit 140 has a phototransistor 150 (hereinafter referred to "PT 150") that performs as a photocoupler in cooperation with a photodiode 151 (hereinafter referred to "PD 151") on the secondary side, described below. The PT 150 performs on/off switchings corresponding to the light emitted from the PD 151. The on/off-state of the switching element 130 is switched corresponding to the on/off-state of the PT 150.

The power supply 2000 adopts a flyback configuration, where energy is stored in the transformer 200 when the switching element 130 is on, while electromotive force is generated on the secondary side when the switching element 130 is off. Accordingly, the polarity of the coil of the primary side is reversed from the polarity of the coil of the secondary side.

In the present embodiment, a self-excitation configuration is adopted, where the oscillating control circuit 140 controls current flowing in the primary side by switching the switching element 130 at an oscillation frequency based on the on/off-state of the PT 150.

However, a separate-excitation configuration is adopted, where PWM-IC or the like controls current flowing in the primary side. Meanwhile, all circuits that can control current flowing in the primary side based on voltage detected at the secondary side, can be applied.

In addition, the power supply 2000 is provided with a first output line 201, a second output line 202, diodes 310, 311 and capacitors 312, 313 at the secondary side. The first output line 201 is connected to one part of the coil on the secondary side, and outputs a first voltage (24V) through the diode 310 and the capacitor 312. The second output line 202 is connected to another part of the coil at the secondary side, and outputs second voltage (3.3V) through the diode 311 and the capacitor 313. The first voltage (24V) is utilized to drive a motor or the like, and the second voltage (3.3V) is utilized to drive a logic circuit or the like.

Additionally, the power supply 2000 is provided with the PD 151, a shunt regulator 321, a variable resistor 330 and a resistor 331. The PD 151 has an anode 151*a* and a cathode 151*b*. The PD 151 lights up when current flows from the anode 151*a* to the cathode 151*b*.

The shunt regulator 321 has an anode 321*a*, a cathode 321*b* and a reference voltage input terminal 321*c*. Current can flow from the cathode 321*b* to the anode 321*a* when voltage greater than a prescribed voltage is applied to the reference voltage input terminal 321*c*.

The anode 151*a* of the PD 151 is connected to the second output line 202 and the cathode 151*b* of the PD 151 is connected to the cathode 321*b* of the shunt regulator 321. The anode 321*a* of the shunt regulator 321 is connected to ground (GND).

One terminal of the variable resistor 330 is connected to the second output line 202. The other terminal of the variable resistor 330 is connected to both the reference voltage input terminal 321*c* and one terminal of the resistor 331. The other terminal of the resistor 331 is connected to GND.

Accordingly, voltage divided by the variable resistor 330 and the resistor 331 is input to the reference voltage input terminal 321*c*. The voltage to be input to the reference voltage input terminal 321*c* can be finely adjusted using a variable resistor 330, for instance in manufacturing procedure.

When the voltage input to the reference voltage terminal 321*c* exceeds the prescribed voltage, that is, the voltage of the second output line 202 exceeds a prescribed voltage, current flows in the PD 151 and the shunt regulator 321 from the second output line 202 to GND, and the PD 151 lights up.

The PT 150 detects the lighting up and off of the PD 151. When the PD 151 lights up, the PT 150 is switched to the on-state causing the switching element 130 to be in the on-state. On the other hand, when the PD 151 lights out, the PT 150 is switched to the off-state causing the switching element 130 to be in the off-state.

Since the power supply 2000 adopts flyback configuration, current cannot flow in the coil of the secondary side due to the diodes 310, 311 when the switching element 130 is switched to the on-state, while current can flow in the coil of the secondary side when the switching element 130 is switched to the off-state.

Since the self-excitation configuration is adopted in the present embodiment, when the PD 151 lights up, that is, the voltage of the second output line 202 rises, the oscillation frequency of the switching element 130 rises in order to decrease the amount of current flowing in the primary side.

On the other hand, when the PD 151 light out, that is, the voltage of the second output line 202 drops, the oscillation frequency of the switching element 130 drops in order to increase the amount of current flowing on the primary side.

Note that if the self-excitation configuration is adopted, when the voltage of the second output line 202 rises, the period when current flows in the primary side is shortened in order to decrease the amount of current flowing in the primary side.

Thus, the voltage output to the second output line 202 is fed back to the primary side of the transformer 200, and current flowing in the coil of the primary side is controlled so that the second voltage is maintained at 3.3V.

In the present embodiment, the power supply 2000 is further provided with a zener diode 410 between the first output line 201 and the second output line 202. The zener diode 410 has an anode 410*a* and a cathode 410*b*. The cathode 410*b* is connected to the first output line 201, while the anode 410*a* is connected to the second output line 202.

When the potential difference between the cathode 410*b* and the anode 410*a*, that is, between the first output line 201 and the second output line 202 exceeds a breakdown voltage (for example, 24V), the zener diode 410 allows current to flow in, that is, current flowing in the first output line 201 is bypassed to the second output line 202. The voltage of the second output line 202 increased by current bypassed from the first output line 201 is fed back to the primary side. Then, the current flowing in the coil of the primary side is controlled so that the voltage in the secondary side decreases.

As described above, the first voltage of the first output line 201 can be placed into the proper range, since current flowing in the first output line 201 is bypassed to the second output line 202. Therefore, overvoltage is not applied to a load connected to the first output line 201. Accordingly, it is not necessary to raise a voltage insulation of the load connected to the first output line 201 and to provide a power supply with a DC-DC converter or a feedback circuit for the first output line 201 in order to control the first voltage of the first output line 201. Hence, it is possible to decrease cost of a power supply.

Figure 4:
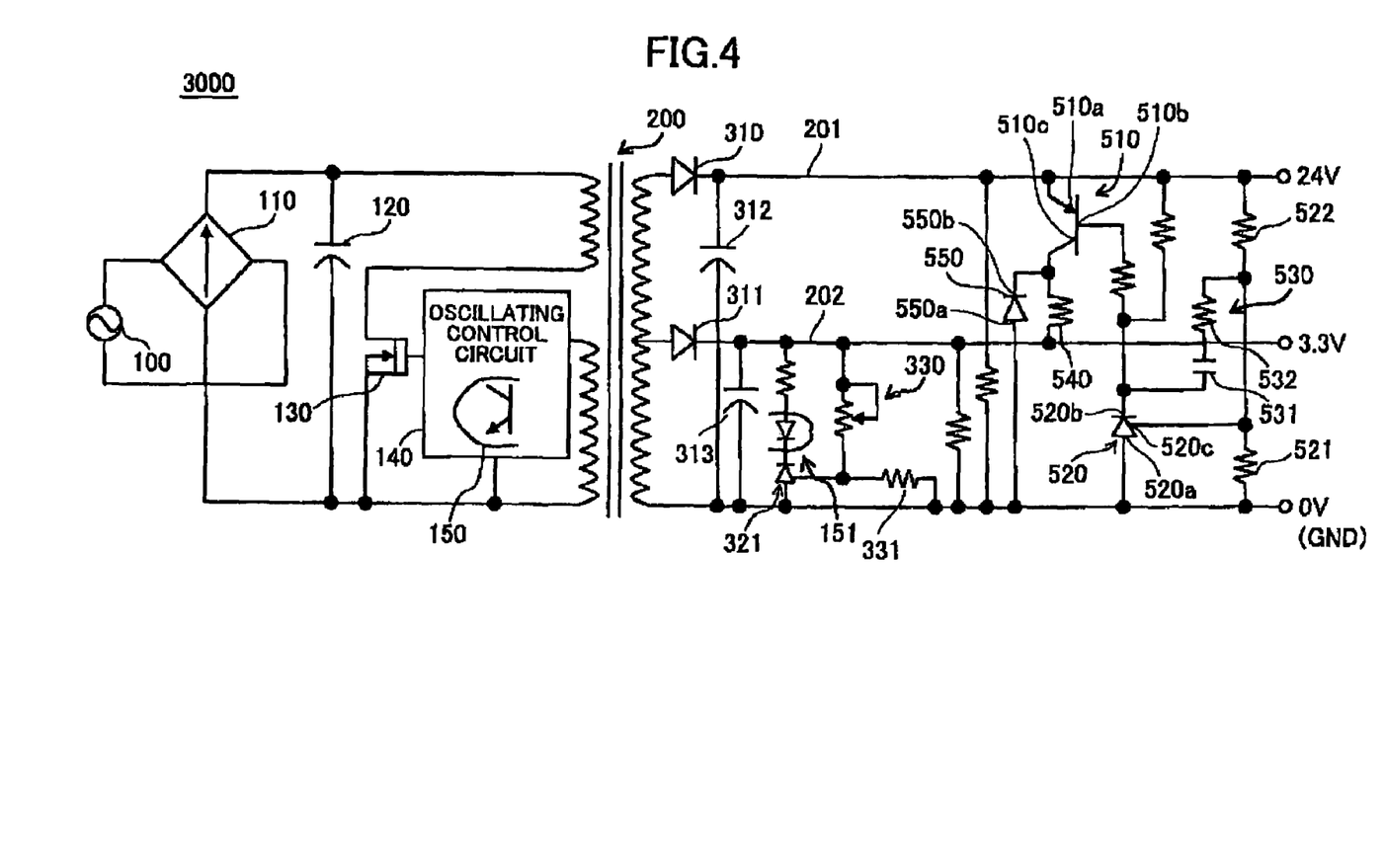
FIG. 4 is a circuit diagram of a power supply of a second embodiment.

Next, the power supply 3000 according to second embodiment of the invention will be described with reference to FIG. 4. FIG. 4 is a circuit diagram of the power supply 3000.

In the present embodiment, a bypass circuit 500 is adopted instead of the zener diode 410 employed in the first embodiment, so that current flowing in the first output line 201 is bypassed to the second output line 202. The portions that are different from the first embodiment will be described for the brevity of simplicity.

The bypass circuit 500 includes a PNP transistor 510 (hereinafter referred to "the transistor 510"), a shunt regulator 520, resistors 521, 522, an RC series circuit 530, an inductor 540, and a diode 550.

The RC series circuit 530 has a capacitor 531 and a resistor 532, where the capacitor 531 and the resistor 532 are connected in series. The shunt regulator 520 has an anode

520a, a cathode 520b, and a reference voltage input terminal 520c. The diode 550 has an anode 550a and a cathode 550b.

The transistor 510 has an emitter 510a, a base 510b and a collector 510c. When current flows from the emitter 510a to the base 510b, current can also flow from the emitter 510a to the collector 510c.

The cathode 520b of the shunt regulator 520 is connected to the base 510b of the transistor 510, while the anode 520a of the shunt regulator 520 is connected to GND. The emitter 510a of the transistor 510 is connected to the first output line 201. The collector 510c is connected to one terminal of the inductor 540 and to the cathode 550b of the diode 550. The other terminal of the inductor 540 is connected to the second output line 202. The anode 550a of the diode 550 is connected to GND.

One terminal of the resistor 522 is connected to the first output line 201. The other terminal of the resistor 522 is connected to the reference voltage input terminal 520c and one terminal of the resistor 521. The other terminal of the resistor 521 is connected to GND. Accordingly, voltage divided by the resistor 521 and the resistor 522 is input to the reference voltage input terminal 520c.

Further, one terminal of the resistor 532 of the RC series circuit 530 is connected to the reference voltage input terminal 520c. One terminal of the capacitor 531 of the RC series circuit 530 is connected to the cathode 520b of the shunt regulator 520.

When the voltage input to the reference voltage terminal 520c exceeds a prescribed voltage, that is, the voltage of the first output line 201 exceeds a prescribed voltage (for example, 28.5V), current flows from the cathode 520b to the anode 520a of the shunt regulator 520. When current flows from the cathode 520b to the anode 520a, the current also flows from the emitter 510a to the base 510b. Then, current also flows from the emitter 510a to the collector 510c.

When current flows from the emitter 510a to the collector 510c, current flows into the second output line 202 through the inductor 540. Thus, current is bypassed from the first output line 201 to the second output line 202, when the voltage of the first output line 201 exceeds a prescribed voltage.

By the way, in this embodiment, the RC series circuit 530 is connected between the cathode 520b and the reference voltage input terminal 520c. When voltage of the first output line 201 is changed, the change of the voltage is not transmitted immediately to the reference voltage input terminal 520c due to the time constant of the RC series circuit 530, where the capacitor 531 outputs voltage to the reference voltage input terminal 520c when voltage of the first input line 201 is decreased, while the capacitor 531 stores a voltage when voltage of the first input line 201 is increased.

Since the voltage input to the reference voltage input terminal 520c is maintained for a certain period of time based on the time constant of the RC series circuit 530, the on/off-state of the transistor 510 is also maintained for the certain period of time. Since the frequency at which the transistor 510 is switched, is reduced, loss of energy consumed by switching of the transistor 510 is also reduced.

In the present embodiment, the power supply 3000 is constituted so that current flows in the shunt regulator 520 when voltage of the first output line 201 exceeds a first prescribed value (for example, in the vicinity of 28.5V), while current cannot flow in the shunt regulator 520 when voltage of the first output line 201 drops to a second prescribed value (for example, in the vicinity of 27.5V).

Consequently, voltage input to the reference voltage input terminal 520c would rise and fall around the voltage at which current can flow in the shunt regulator 520. In that case, maximum value of the voltage input to the reference voltage input terminal 520c is the first prescribed value, while minimum value of the voltage input to the reference voltage input terminal 520c is the second prescribed value.

In addition, in this embodiment, the inductor 540 is interposed between the collector 510c of the transistor 510 and the second output line 202. When current flows from the emitter 510a to the collector 510c, electricity is stored in the inductor 540. Then, the polarity of GND side of the inductor 540 becomes positive while the polarity of the collector 510c side becomes negative. Accordingly, the electricity stored in the inductor 540 is supplied as current to the second output line 202 when the transistor 510 is rendered off. Therefore, loss of energy is reduced.

The current supplied from the inductor 540 to the second output line 202 is gradually decreased in accordance with the decrease of the electricity stored in the inductor 540. Then, the amount of current flowing in the primary side of the transformer 200 gradually increases in order to increase the voltage of the secondary side. The voltage of the first output line 201 thus comes to stabilize in the range between, for example, about 28.5V (the first voltage) and about 27.5V (the second voltage). Thus, the output voltage of the first output line is prevented from rising more than necessary.

In addition, the cathode 550b of the diode 550 is connected to the collector 510c side of the inductor 540, while the anode 550a of the diode 550 is connected to the GND line. Therefore, current which flows on the GND line via the load is regenerated in the inductor 540. Thus, energy usage efficiency is further improved.

In the present embodiment, the bypass of current is realized based on the output voltage of the first output line 201, that is, the potential difference between the first output line 201 and the ground line (GND), unlike the power supply in the first embodiment.

While the invention has been described in detail with reference to the specific embodiment thereof, it would be apparent to those skilled in the art that various changes and modifications may be made therein without departing from the spirit of the invention.

For example, a bipolar transistor, FET, shunt regulator or the like may be utilized as the switching element of the current bypass circuit. If a bipolar transistor is utilized as the switching element, the on/off-state of the bipolar transistor is controlled based on information input to the base. If the FET is utilized as the switching element, the on/off-state of the FET is controlled based on information input to the gate. If the shunt regulator is utilized as the switching element, the on/off-state of the shunt regulator is controlled based on information input to the reference voltage input terminal. Further, the current bypass circuit may be constituted by a plurality of elements as in the second embodiment.

In the second embodiment, a PNP transistor is utilized as the current bypass circuit that bypasses current from the first output line 201 to the second output line 202. However, an NPN transistor, FET or the like may be utilized as the current bypass circuit. In addition, it is also possible to utilize a constant voltage element such as a constant voltage diode instead of the shunt regulator 520.

In the second embodiment, the RC series circuit 530, the inductor 540, and the diode 550 were provided in order to improve energy usage efficiency. However, if it is desired to simply inhibit of rises in the voltage of the first output line 201, the RC series circuit 530, the inductor 540, and the diode 550 can be dispensed with.

What is claimed is:

1. A power supply comprising:
   a transformer having a primary side and a secondary side;
   a first output line derived from a first point on the secondary side, the first output line outputting a first voltage;
   a second output line derived from a second point on the secondary side, the second output line outputting a second voltage lower than the first voltage;
   a controller that controls an amount of current flowing in the primary side based on the second voltage so that the second voltage is maintained at a prescribed voltage;
   a current bypass circuit that controls current flowing in the first output line to flow in the second output line when a potential difference between the first voltage and the second voltage exceeds a prescribed value; and
   a storage unit connected between the current bypass circuit and the second output line, wherein the storage unit stores electric charges when current is flowing from the first output line to the second output line whereas the storage unit supplies the electric charges stored therein for the second output line when current is prevented from flowing from the first line to the second output line.

2. The power supply according to claim 1, wherein the current bypass circuit comprises a switching element connected between the first output line and the second output line, wherein the switching element is closed when the potential difference exceeds the prescribed value whereas the switching element is open when the potential difference is equal to or below the prescribed value.

3. The power supply according to claim 1, wherein the current bypass circuit comprises a zener diode having an anode terminal connected to the second output line and a cathode terminal connected to the first output line, wherein the zener diode allows current to flow from the first output line to the second output line when the potential difference exceeds the prescribed value whereas the zener diode prevents current from flowing from the first output line to the second output line when the potential difference is equal to or below the prescribed value.

4. The power supply according to claim 1, wherein the current bypass circuit comprises a shunt regulator having an anode terminal connected to the second output line, a cathode terminal connected to the first output line, and a detecting terminal connected to detect the potential difference, wherein the shunt regulator allows current to flow from the first output line to the second output line when the potential difference exceeds the prescribed value, whereas the shunt regulator prevents current from flowing from the first output line to the second output line when the potential difference is equal to or below the prescribed value.

5. The power supply according to claim 1, wherein the current bypass circuit comprises a transistor, wherein the transistor allows current to flow therein when the potential difference exceeds the prescribed value, whereas the transistor prevents current from flowing therein when the potential difference is equal to or below the prescribed value.

6. The power supply according to claim 1, wherein the current bypass circuit comprises a shunt regulator having an anode terminal connected to the second output line, a cathode terminal and a detecting terminal to detect the potential difference, and a transistor having a first terminal connected to the cathode terminal, a second terminal connected to the second output line and a third terminal connected to the first terminal, wherein the shunt regulator controls the transistor to close when the potential difference exceeds the prescribed value, whereas the shunt regulator controls the transistor to open when the potential difference is equal to or below the prescribed value.

7. The power supply according to claim 1, further comprising a delaying unit that transmits the potential difference to the current bypass circuit after a prescribed time has elapsed.

8. The power supply according to claim 7, wherein the delaying unit comprises a resistor and a capacitor connected in series.

9. The power supply according to claim 1, wherein the storage unit comprises an inductor having a first terminal connected to the current bypass circuit and a second terminal connected to the second output line.

10. The power supply according to claim 9, further comprising a rectifier element having an anode terminal connected to ground and a cathode terminal connected to the first terminal of the inductor.

11. A power supply comprising:
    a transformer having a primary side and a secondary side;
    a first output line derived from a first point on the secondary side, the first output line outputting a first voltage;
    a second output line derived from a second point on the secondary side, the second output line outputting a second voltage lower than the first voltage;
    a controller that controls an amount of current flowing in the primary side based on the second voltage so that the second voltage is maintained at a prescribed voltage;
    a current bypass circuit that controls current flowing in the first output line to flow in the second output line when the first voltage exceeds a prescribed value; and
    a storage unit connected between the current bypass circuit and the second output line, wherein the storage unit stores electric charges when current is flowing from the first output line to the second output line whereas the storage unit supplies the electric charges stored therein for the second output line when current is prevented from flowing from the first line to the second output line.

12. The power supply according to claim 11, wherein the current bypass circuit comprises a switching element connected between the first output line and the second output line, wherein the switching element is closed when the first voltage exceeds the prescribed value whereas the switching element is open when the first voltage is equal to or below the prescribed value.

13. The power supply according to claim 11, wherein the current bypass circuit comprises a shunt regulator having an anode terminal connected to the second output line, a cathode terminal connected to the first output line, and a detecting terminal connected to detect the first voltage, wherein the shunt regulator allows current to flow from the first output line to the second output line when the first voltage exceeds the prescribed value, whereas the shunt regulator prevents current from flowing from the first output line to the second output line when the first voltage is equal to or below the prescribed value.

14. The power supply according to claim 11, wherein the current bypass circuit comprises a transistor, wherein the transistor allows current to flow therein when the first voltage exceeds the prescribed value, whereas the transistor prevents current from flowing therein when the first voltage is equal to or below the prescribed value.

15. The power supply according to claim 11, wherein the current bypass circuit comprises a shunt regulator having an anode terminal connected to the second output line, a cathode terminal and a detecting terminal to detect the first voltage, and a transistor having a first terminal connected to the cathode terminal, a second terminal connected to the second output line and a third terminal connected to the first terminal, wherein the shunt regulator controls the transistor to close when the first voltage exceeds the prescribed value, whereas the shunt regulator controls the transistor to open when the first voltage is equal to or below the prescribed value.

16. The power supply according to claim 11, further comprising a delaying unit that transmits the first voltage to the current bypass circuit after a prescribed time has elapsed.

17. The power supply according to claim 16, wherein the delaying unit comprises a resistor and a capacitor connected in series.

18. The power supply according to claim 11, wherein the storage unit comprises an inductor having a first terminal connected to the current bypass circuit and a second terminal connected to the second output line.

19. The power supply according to claim 18, further comprising a rectifier element having an anode terminal connected to ground and a cathode terminal connected to the first terminal of the inductor.

* * * * *